United States Patent
Okada

(10) Patent No.: US 10,529,062 B2
(45) Date of Patent: Jan. 7, 2020

(54) IMAGE PROCESSING DEVICE

(71) Applicant: Yasuhiro Okada, Kanagawa (JP)

(72) Inventor: Yasuhiro Okada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 15/623,747

(22) Filed: Jun. 15, 2017

(65) Prior Publication Data

US 2018/0005355 A1 Jan. 4, 2018

(30) Foreign Application Priority Data

Jun. 29, 2016 (JP) .................................. 2016-128794

(51) Int. Cl.
*G06T 5/00* (2006.01)
*G06T 3/00* (2006.01)
*G06T 5/50* (2006.01)
*G06T 1/60* (2006.01)
*H04N 5/217* (2011.01)
*H04N 5/357* (2011.01)

(52) U.S. Cl.
CPC ............... *G06T 5/006* (2013.01); *G06T 1/60* (2013.01); *G06T 3/0006* (2013.01); *G06T 3/0018* (2013.01); *G06T 5/50* (2013.01); *H04N 5/217* (2013.01); *H04N 5/3572* (2013.01); *G06T 2200/28* (2013.01)

(58) Field of Classification Search
CPC ......... G06T 5/006; G06T 1/60; G06T 3/0006; G06T 5/50; G06T 3/0018; G06T 2200/28; H04N 5/3572; H04N 5/217
USPC .............. 358/1.9, 3.5; 382/261, 275; 399/27
See application file for complete search history.

(56) References Cited

U.S. PATENT DOCUMENTS

| 7,433,547 B2 * | 10/2008 | Yamamoto | H04N 5/367 345/427 |
| 7,492,481 B2 * | 2/2009 | Fujimori | H04N 1/40068 358/3.09 |
| 7,710,608 B2 * | 5/2010 | Takahashi | H04N 1/4015 347/14 |

(Continued)

FOREIGN PATENT DOCUMENTS

| JP | 2002-342159 | 11/2002 |
| JP | 2015-099959 | 5/2015 |

OTHER PUBLICATIONS

Ozaki, Tomoaki, "Apparatus and method of image processing, and electric apparatus," English Translation of Japanese Patent Publication JP2015-099959 A, May 28, 2015.*

*Primary Examiner* — Xuemei G Chen
(74) *Attorney, Agent, or Firm* — Oblon, McClelland, Maier & Neustadt, L.L.P.

(57) ABSTRACT

An image processing device includes a parameter processing circuit and an image correction circuit. The image processing device rearrange a plurality of parameters in order of a plurality of reference image data items written to an image memory. The image correction circuit includes a parameter memory, a pixel calculation circuit, an acquisition circuit, a comparison circuit, and a logic circuit. The image correction circuit reads one of one of the plurality of reference image data items from the image memory storing input image data and perform image correction on the one of the plurality of reference image data items to generate an output image corresponding to one of a plurality of output image areas.

11 Claims, 9 Drawing Sheets

(56) References Cited

U.S. PATENT DOCUMENTS

| | | | | |
|---|---|---|---|---|
| 7,986,837 B2* | 7/2011 | Aoki | ............ | G06K 9/00463 |
| | | | | 358/1.9 |
| 8,284,458 B2* | 10/2012 | Kikuchi | ............ | H04N 1/00846 |
| | | | | 358/1.13 |
| 8,339,677 B2* | 12/2012 | Nakagata | ............ | G06T 5/006 |
| | | | | 358/3.26 |
| 8,488,203 B2* | 7/2013 | Higashiyama | ............ | H04N 1/506 |
| | | | | 358/3.15 |
| 8,508,792 B2* | 8/2013 | Arakawa | ............ | H04N 1/00856 |
| | | | | 283/902 |
| 8,781,343 B2* | 7/2014 | Hayashi | ............ | G03G 15/04054 |
| | | | | 399/27 |
| 9,900,465 B2* | 2/2018 | Ohta | ............ | H04N 1/2104 |
| 2009/0185754 A1* | 7/2009 | Okamura | ............ | G06T 1/20 |
| | | | | 382/261 |
| 2009/0190856 A1* | 7/2009 | Omori | ............ | G06T 5/006 |
| | | | | 382/275 |
| 2009/0268046 A1* | 10/2009 | Ogawa | ............ | G06T 3/0018 |
| | | | | 348/222.1 |

* cited by examiner

FIG. 5

| bit of DDR | 31 30 29 28 27 26 25 24 23 22 21 20 19 18 17 16 15 14 13 12 11 10 9 8 7 6 5 4 3 2 1 0 |
|---|---|
| REFERENCE IMAGE CUT-OUT DATA (AREA N) | HEAD DDR ADDRESS OF REFERENCE IMAGE [31:0] |
| | THE NUMBER OF MAIN SCANNING PIXELS OF REFERENCE IMAGE [9:0] / THE NUMBER OF SUB-SCANNING PIXELS OF REFERENCE IMAGE [9:0] |
| REFERENCE PIXEL SPECIFYING DATA (AREA N) | X ADDRESS [7:0] / Y ADDRESS [7:0] / X SUB-PIXEL [3:0] / Y SUB-PIXEL [3:0] / BLEND COEFFICIENT [7:0] |

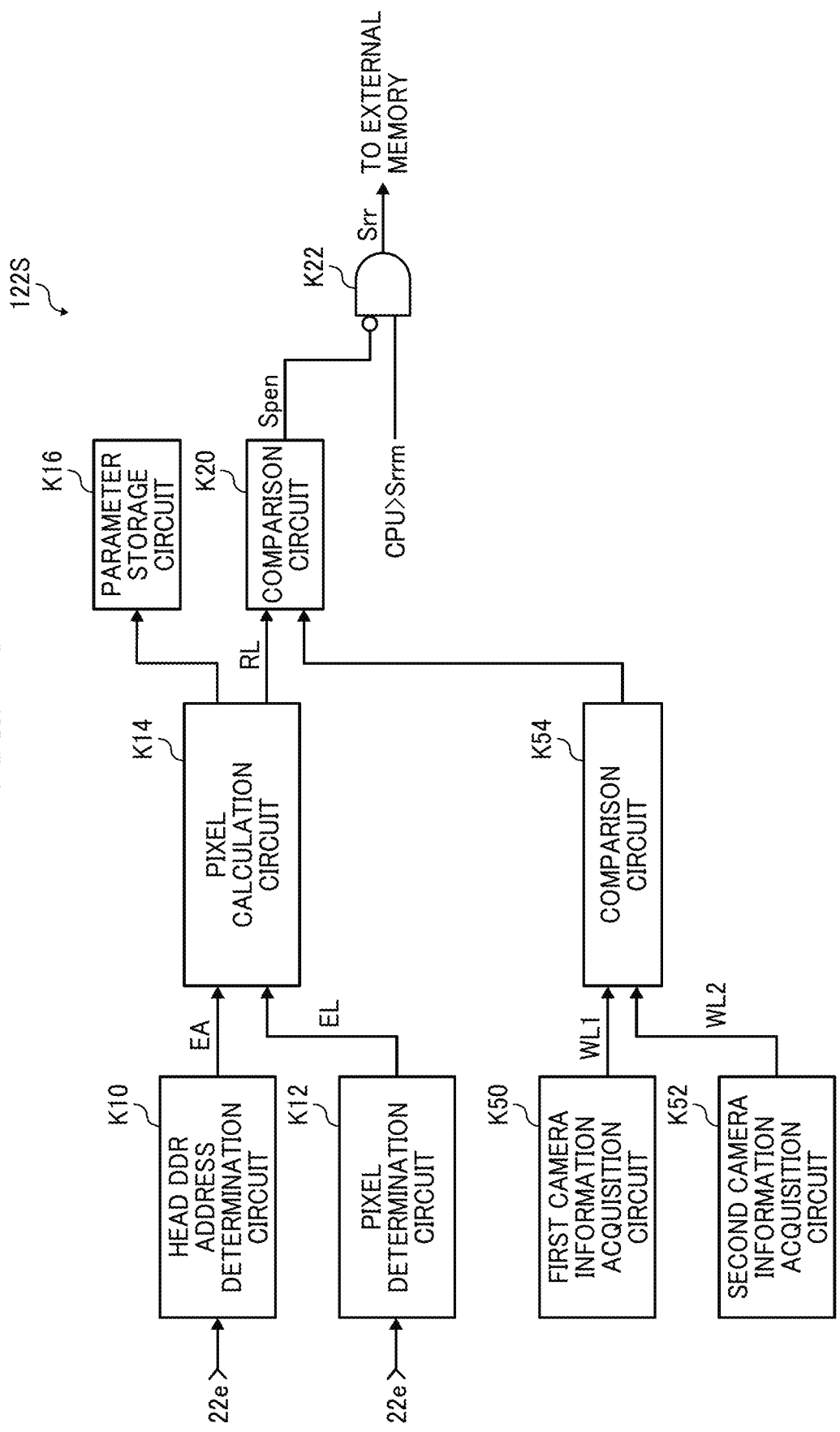

IMAGE PROCESSING DEVICE

CROSS-REFERENCE TO RELATED APPLICATION

This patent application is based on and claims priority pursuant to 35 U.S.C. § 119(a) to Japanese Patent Application No. 2016-128794, filed on Jun. 29, 2016, in the Japan Patent Office, the entire disclosure of which is hereby incorporated by reference herein.

BACKGROUND

Technical Field

Embodiments of the present disclosure relate to an image processing device.

Related Art

An imaging element included in a device such as a digital camera forms an image based on light that passes through a lens, to generate original image data. Yet such original image data has distortion because of aberration of the lens.

In particular, wide-angle lenses and fish-eye lenses have a curved surface, so that the distortion rate at the edge of the lens is larger than that in the center of lens, resulting in marked distortion of the original image data obtained using such lenses. When such original image data is displayed on a monitor without correction, the farther an area is from the center, the poorer the visibility becomes.

Affine transformation is one example of a known image correction processing technique used to transform such original image data having distortion into rectangular shaped image data without distortion. Moreover, as a frame memory to store the original image data obtained through the lens, double data rate (DDR) memories are often used.

In generating an output image, a known technique divides the output image into a plurality of output image areas, cuts out a part of an area of original image data needed for each of the output image areas, and stores the part of the area of original image data into a static random access memory (SRAM) able to be written and read at high speed, and then generates output by performing a correction.

The known correction is performed using a method involving counting the number of lines in a sub-scanning direction corresponding to data that is already stored in the DDR memory in the middle of storing the original image data in the DDR memory, comparing the counted number of lines in the sub-scanning direction and the required number of lines in the sub-scanning direction of the original image data to generate the output image, and performing the correction (affine transformation) when the counted number of lines in the sub-scanning direction becomes larger than the required number of lines in the sub-scanning direction to generate the output image. With this method, the correction is performed for each required number of lines before the data corresponding to one frame is completely stored in the DDR memory.

SUMMARY

An improved image processing device includes a parameter processing circuit and an image correction circuit. The parameter processing circuit rearranges a plurality of parameters in order of a plurality of reference image data items written to an image memory, with each of the plurality of parameters having a corresponding one of the plurality of reference image data items. The image correction circuit reads one of the plurality of reference image data items from the image memory storing input image data, which is to be reference image data corresponding to the plurality of reference image data items, and perform image correction on the one of the plurality of reference image data items to generate an output image corresponding to one of a plurality of output image areas.

The image correction circuit includes a parameter memory to store each of the plurality of parameters used for reading the corresponding one of the plurality of reference image data items from the image memory storing the input image data. The image correction circuit also includes a pixel calculation circuit to calculate the required number of pixels in a sub-scanning direction required to perform the image correction on the one of the plurality of reference image data items to generate the output image corresponding to the one of the plurality of output image areas based on the corresponding one of the plurality parameters obtained from the parameter processing circuit. The image correction circuit also includes an acquisition circuit to acquire the number of written pixels in the sub-scanning direction already written to the image memory in the middle of writing the input image data. The image correction circuit also includes a first comparison circuit to compare the required number of pixels in the sub-scanning direction and the number of written pixels in the sub-scanning direction. The image correction circuit also includes a logic circuit to determine whether the one of the plurality reference image data items corresponding to the one of the plurality of parameters can be acquired from the image memory based on a result of a comparison performed by the first comparison circuit.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings;

FIG. 5 is an illustration of an example of a parameter used by the image correction circuit;

FIG. 14 is an illustration of a sequencer circuit that processes a plurality of input images and order of steps in processing therein.

DETAILED DESCRIPTION

Figure 1:
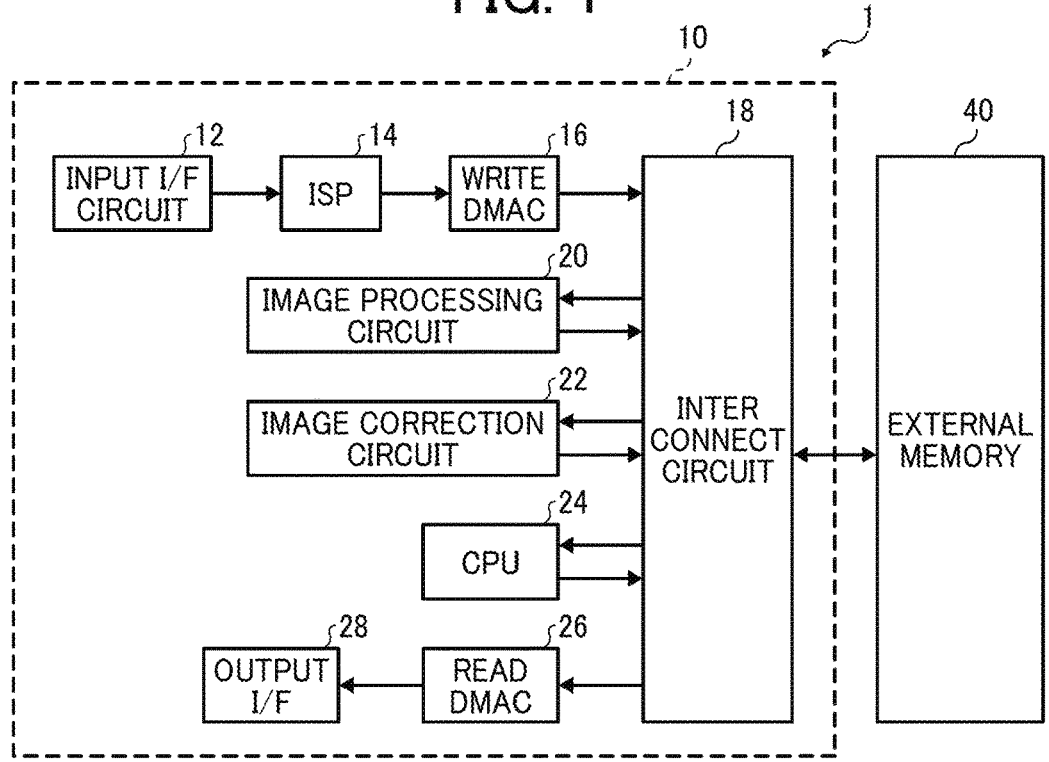
FIG. 1 is a block diagram illustrating an image processing device according to a first embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Several embodiments of the present disclosure are described below with reference to the drawings. According to the embodiments of the disclosure, an image processing device that can reduce frame delay caused by image correction is provided.

First Embodiment

Overall Configuration

FIG. 1 is a block diagram illustrating an image processing device 1 according to a first embodiment of the present disclosure.

As illustrated in FIG. 1, the image processing device 1 includes a semiconductor device 10 and an external memory 40 configured with a double data rate_synchronous dynamic random access memory (DDR_SDRAM) and serving as a frame memory. The semiconductor device 10 and the external memory 40 may be mounted on the same substrate.

In FIG. 1, the semiconductor device 10 includes an input interface (I/F) circuit 12, an image signal processor (ISP) 14, a write direct memory access controller (write DMAC) 16, and an interconnect circuit 18.

The semiconductor device 10 further includes an image processing circuit 20, an image correction circuit 22, a central processing unit (CPU) 24, a read direct memory access controller (read DMAC) 26, and an output I/F circuit 28.

The input I/F circuit 12 receives image data (input image data) from a charge-coupled device (CCD) sensor used in a device such as a camera and converts the input image data into a predetermined format to generate raw data to be output to the ISP 14.

The ISP 14 performs image processing (ISP processing) on the raw data received, and then outputs the raw data to the external memory 40 via the write DMAC 16 and the interconnect circuit 18. The ISP processing mainly includes optical correction associated with lens and defect correction in units of pixels to correct a defect occurring due to, for example, variation related to an image sensor.

The write DMAC 16 block-transfers and writes the image data processed with the ISP 14 to the external memory 40.

The interconnect circuit 18 is connected to the external memory 40, the image correction circuit 22, and the read DMAC 26, and serves as an arbitration circuit between the external memory 40 and each circuit connected to the external memory 40.

The image processing circuit 20 includes a filter circuit and a y conversion circuit.

The image correction circuit 22 performs any desired image correction, such as lens distortion correction, on reference image data based on a parameter and the reference image data obtained from the external memory 40 via the interconnect circuit 18. The image correction circuit 22 then outputs the processed image data to the external memory 40 via the interconnect circuit 18 to store the processed image data in the external memory 40. The image correction circuit 22 performs such as rotation processing and size enlargement/reduction processing on image data as the image correction.

Figure 2:
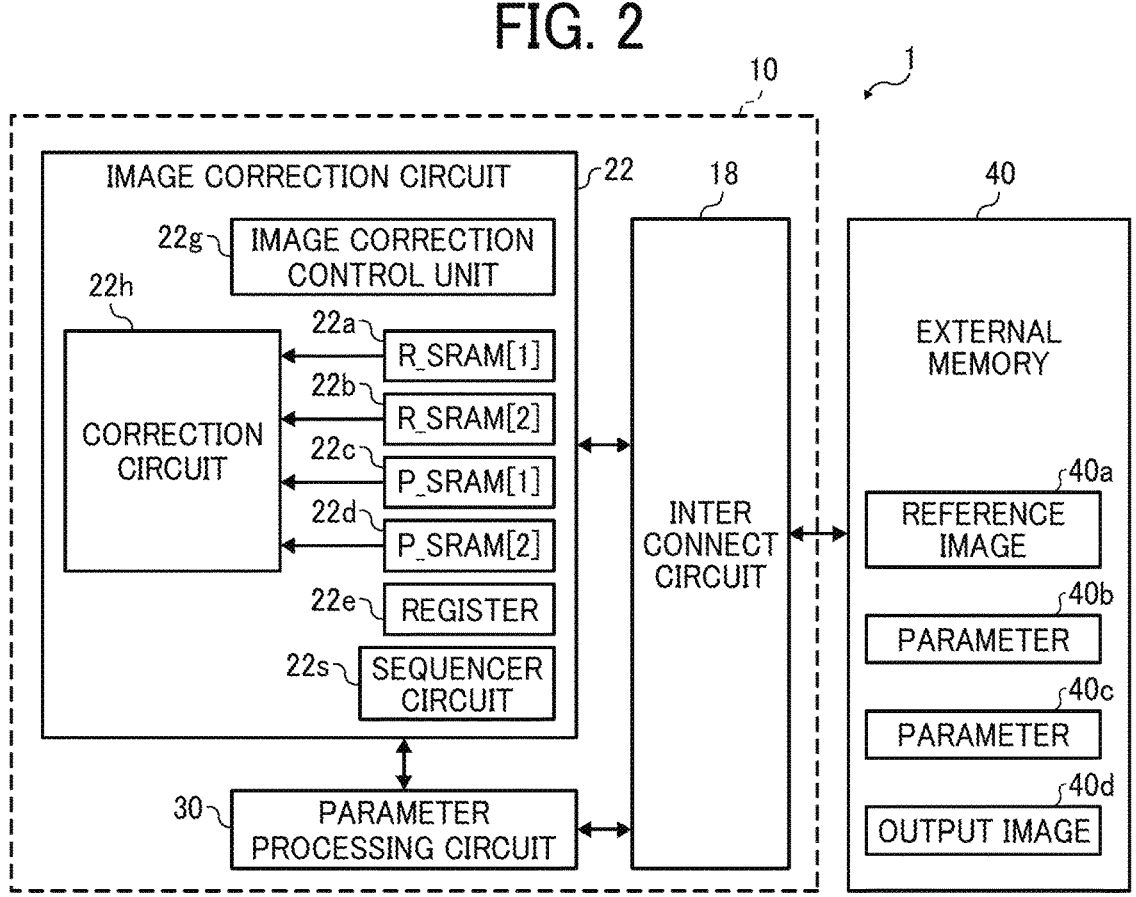
FIG. 2 is a block diagram illustrating the image processing device according to the first embodiment for explaining an image correction circuit and a component related to the image correction circuit.

The CPU 24 controls a correction circuit 22h illustrated in FIG. 2, a sequencer circuit 22s illustrated in FIG. 2, the write DMAC 16, and the read DMAC 26 for read and write operation, by outputting a control signal to a register 22e and a register in each DMAC via the interconnect circuit 18.

The read DMAC 26 reads the processed image data stored in an output image storage unit 40d, illustrated in FIG. 2, of the external memory 40 via the interconnect circuit 18 and outputs the read image data to the output I/F circuit 28. The read DMAC 26 also reads image data from a reference image storage unit 40a, illustrated in FIG. 2, and outputs the image data to the image correction circuit 22 via the interconnect circuit 18.

The output I/F circuit 28 outputs the processed image data read from the external memory 40 with the read DMAC 26 to various video image display devices that are externally provided.

Image Correction Circuit and Related Blocks

FIG. 2 is a block diagram illustrating the image processing device 1 according to the first embodiment for explaining the image correction circuit 22 in FIG. 1 and components related to the image correction circuit 22.

In the external memory 40 illustrated in FIG. 2, the reference image storage unit 40a stores a reference image as a plurality of reference image data items, which is an input image and used by the image correction circuit 22, and a parameter storage unit 40b stores a plurality of parameters before rearrangement in relation to corresponding areas (output image areas), which are described later. A parameter storage unit 40c stores the plurality of parameters after the rearrangement in relation to the corresponding areas.

A read static random access memory (R_SRAM) [1] 22a and a R_SRAM [2] 22b included in the image correction circuit 22 are work areas to perform the image correction after storing the reference image data item referred from the reference image storage unit 40a of the external memory 40.

A P_SRAM [1] 22*c* and a P_SRAM [2] 22*d* are areas to store the parameters referred from the external memory 40.

The parameters, each corresponding to one area, are different from one another, so that the P_SRAM [1] 22*c* and the P_SRAM [2] 22*d* are toggled in performing image transfer and image correction. In addition to that, the R_SRAM [1] 22*a* and the R_SRAM [2] 22*b* are also toggled based on SRAM number of the parameter.

The correction circuit 22*h* reads the parameter and the reference image data item from the P_SRAM [1] 22*c* and the R_SRAM [1] 22*a*, or the P_SRAM [2] 22*d* and the R_SRAM [2] 22*b* to generate an output pixel. The image correction control unit 22*g* controls each component of the image correction circuit 22.

In FIG. 2, two pairs of P_SRAM and R_SRAM are illustrated, however the embodiment is not limited to this, but more than two pairs of P_SRAM or R_SRAM may be provided to increase processing speed in performing image transfer and image correction.

The register 22*e* provided in the image correction circuit 22 stores information on the reference image, such as the number of pixels in a main scanning direction and the number of lines in a sub-scanning direction. The image correction circuit 22 includes the sequencer circuit 22*s* to perform sequential operation in reading the reference image.

The parameter processing circuit 30 reads the parameters stored in the parameter storage unit 40*b*. The parameter processing circuit 30 performs calculation processing and comparison processing in association with the required number of pixels in the sub-scanning direction that is the number of pixels required for each area to be subjected to the image correction. The parameter processing circuit 30 rearranges the parameters in a groups of parameters (FIG. 4) acquired from the parameter storage unit 40*b* according to a priority in relation to the output image areas and then writes the group of parameters after the rearrangement (FIG. 7) to the parameter storage unit 40*c*.

In this embodiment, the external memory 40 (FIG. 2), which stores the input/output image data, is also used as a memory for arrangement of the parameters. The input image data, the image data corresponding to each area after the image correction, and each parameter used for performing the image correction are individually assigned with an address offset to be arranged in a different storage area on the external memory 40.

Output Image Areas

Figure 3:
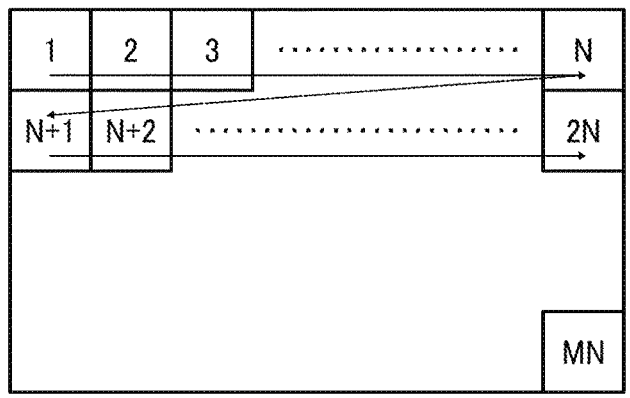
FIG. 3 is an illustration of an output image for explaining output image areas.

FIG. 3 is an illustration of an output image for explaining output image areas. Output image data generated by the image processing device 1 of FIG. 2 is divided into N areas in the main scanning direction and divided into M areas in the sub-scanning direction, resulting in MN areas as a total in the output image data.

In the output image data divided into the areas (output image areas), areas from 1 to N are defined as a first area line, areas from N+1 to 2N are defined as a second area line, and the last area line is defined as an Mth area line.

Reference Image Cut-Out Data and Reference Pixel Specifying Data

Figure 4:
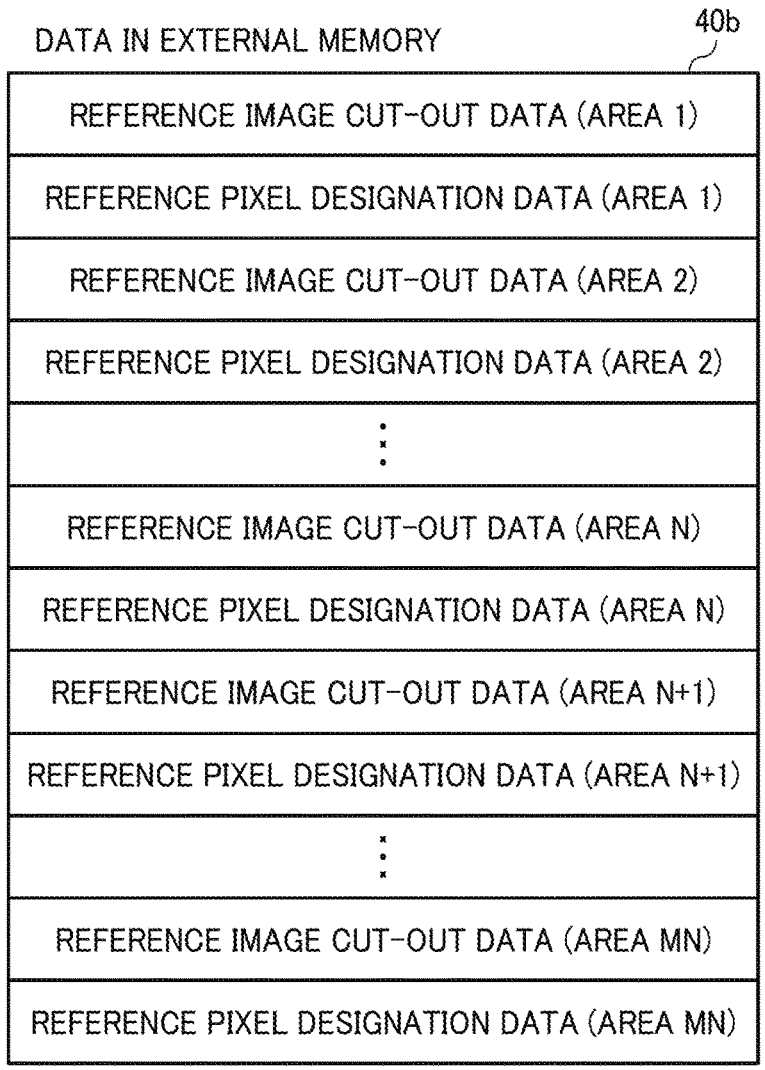
FIG. 4 is an illustration of a group of parameters stored in a parameter storage unit.

FIG. 4 is an illustration of a group of parameters stored in the parameter storage unit 40*b* of the external memory 40. Each parameter includes reference image cut-out data and reference pixel specifying data, and indicates the input image corresponding to each output image area. The parameters are arranged in the parameter storage unit 40*b* of the external memory 40 in order of array of the output image areas illustrated in FIG. 3.

The reference image cut-out data is used for cutting the reference image out of an original image being input. The reference pixel specifying data is used for designating a pixel value and a sub pixel value of a pixel of the reference image to generate one pixel of the output image.

Each parameter for the corresponding area is determined based on information such as a lens distortion factor, and stored in the parameter storage unit 40*b*. The parameter is read from the parameter storage unit 40*b* to be used.

Parameter

FIG. 5 is an illustration of an example of a parameter used by the image correction circuit 22. As illustrated in FIG. 5, the parameter includes the reference image cut-out data and the reference pixel specifying data.

The reference image cut-out data includes a head DDR address, the number of pixels in the main scanning direction, and the number of lines in the sub-scanning direction. The head DDR address has a 32-bit length and indicates a head of the corresponding reference image presented by the reference image data item. The number of pixels in the main scanning direction has a 10-bit length and corresponds to the number of pixels of the reference image corresponding to the reference image data item in the main scanning direction, which may be referred to as the number of main scanning direction pixels, here. The number of lines (pixels) in the sub-scanning direction has a 10-bit length and corresponds to the number of lines of the reference image corresponding to the reference image data item in the sub-scanning direction, which may be referred to as the number of sub-scanning direction lines (pixels), here.

The reference pixel specifying data includes an address value and a sub-pixel value that specify the pixel in detail and a blend coefficient. The address value has an X address of an 8-bit length and Y address of an 8-bit length. The sub-pixel value has an X sub-pixel of a 4-bit length and a Y sub-pixel of a 4-bit length. The blend coefficient has an 8-bit length and is used for multiplying the data after the image correction. In the description of the disclosure, the detailed description of the blend coefficient is omitted.

Image Output Processing

Figure 6:
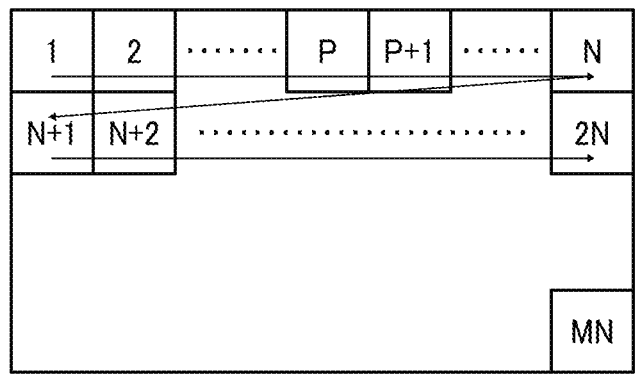
FIG. 6 is an illustration of an output image for explaining output image processing.

FIG. 6 is an illustration of an output image for explaining image output processing. As illustrated in FIG. 6, the output image to be generated with the image correction circuit 22 is divided into N areas in the main scanning direction and M areas in the sub-scanning direction, so that one frame image is divided into MN areas.

The image correction processing starts from a Pth area. The areas from P to N in the main scanning direction are output first, and then the areas from 1 to P−1 in the main scanning direction are output. In the sub-scanning direction, M areas are output.

Rearrangement of Parameters

Figure 7:
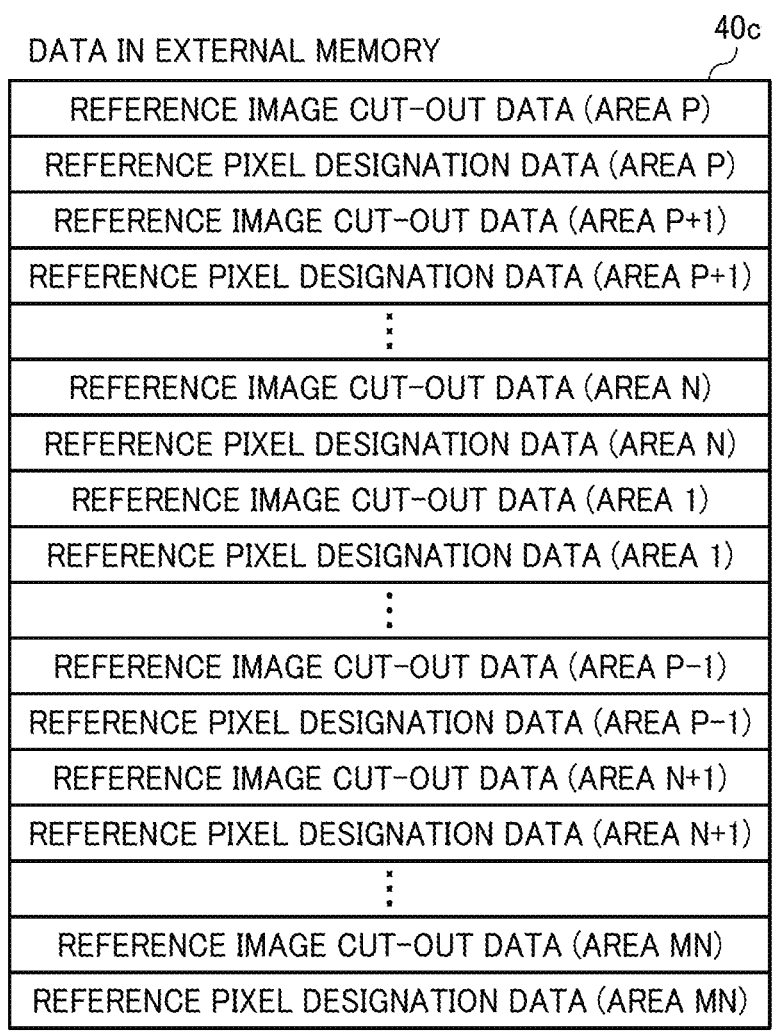
FIG. 7 is an illustration of parameters corresponding to the output image of FIG. 6.

FIG. 7 is an illustration of the parameters corresponding to the output image of FIG. 6. For example, when a camera implementing a fish-eye lens is used and the images (pixels) output sequentially from the camera, the Pth area is at an effective image position (or pixel) in the image that is output first. Accordingly, the correction processing starts from the Pth area in the embodiment.

The parameters (reference image cut-out data and reference pixel specifying data) are rearranged so that an area corresponding to one of the plurality of reference image data items that is stored first in the reference image storage unit 40*a* is to be a start position. In the rearrangement, the number of pixels in the sub-scanning direction for each reference image data item, namely the required number of lines for performing the image correction for each area, is taken into consideration.

In the example of FIG. 7, the parameter (reference image cut-out data (area P) and the reference pixel specifying data (area P)) corresponding to the area P is stored first in the parameter storage unit 40c, because the reference image data item, namely the required pixels for the image correction, corresponding to the area P is stored first in the reference image storage unit 40a among the plurality of the reference image data items of reference image. After that, the other parameters from the parameter (reference image cut-out data (area P+1) and the reference pixel specifying data (area P+1)) corresponding to the area P+1 to the parameter (reference image cut-out data (area MN) and the reference pixel specifying data (area MN)) corresponding to the area MN are stored in the parameter storage unit 40c.

A pair of reference image cut-out data and the reference pixel specifying data included in each parameter corresponding to one of the output image areas is prepared in advance in the parameter storage unit 40b in units of areas, namely one parameter is prepared for units of areas.

The parameter processing circuit 30 described above rearranges the parameters in advance according to the priority in the output image areas and stores the rearranged parameters in the parameter storage unit 40c prior to performing the image correction. The parameter processing circuit 30 can arbitrarily change a method of setting the priority in relation to the output image areas. Alternatively, the rearrangement of the parameters performed by the parameter processing circuit 30 may be performed by the CPU 24 instead of the parameter processing circuit 30.

Sequencer Circuit

Figure 8:
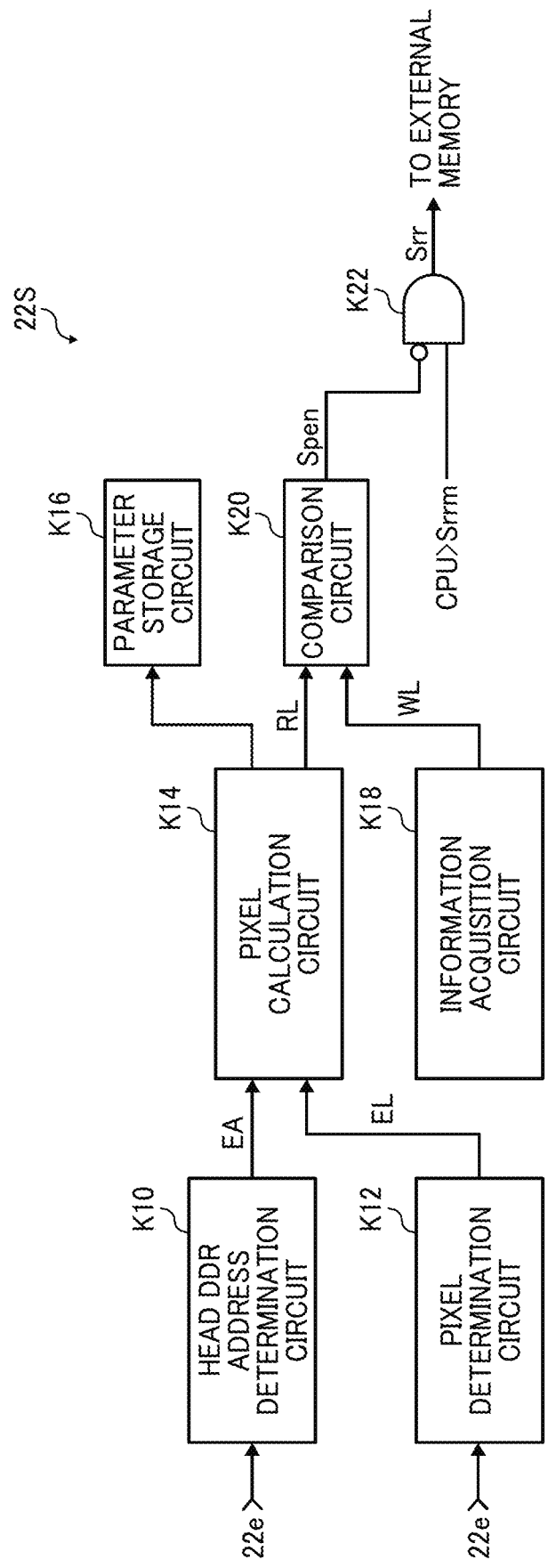
FIG. 8 is a diagram illustrating a sequencer circuit provided in the image correction circuit and an example of order of steps of processing therein.

FIG. 8 is a diagram illustrating the sequencer circuit 22s provided in the image correction circuit 22 and an example of order of steps in processing thereof. The sequencer circuit 22s includes a head DDR address determination circuit K10, a pixel determination circuit (the number of sub-scanning direction pixel determination circuit) K12, a pixel calculation circuit (the required number of sub-scanning pixel calculation circuit) K14, a parameter storage circuit K16, an information acquisition circuit K18, a comparison circuit K20, and an AND circuit K22.

The sequencer circuit 22s determines whether a reference image read request signal Srr from the CPU 24 is output to the external memory 40 based on data set in the register 22e by the CPU 24.

In the embodiment, the reference image being input is assumed as one image obtained in such as a video conference system using a monocular camera.

The head DDR address determination circuit K10 determines the reference image cut-out data and a head DDR address EA of the output image corresponding to each output image area based on the number of pixels in the main scanning direction of the input image and lens information obtained from the register 22e.

Subsequently, the pixel determination circuit K12 determines the reference image cut-out data and the number of pixels in the sub-scanning direction EL of the output image corresponding to each output image area based on the number of pixels in the main scanning direction of the input image and lens information obtained from the register 22e.

Then, the pixel calculation circuit K14 calculates the required number of pixels in the sub-scanning direction RL of the area that has the minimum number of pixels in one area line. The required number of pixels in the sub-scanning direction RL is the number of pixels that is required for the image correction. The calculation is based on the information obtained with the head DDR address determination circuit K10 and the pixel determination circuit K12, namely the reference image cut-out data and the head DDR address EA of the output image corresponding to each output image area and the reference image cut-out data and the number of pixels in the sub-scanning direction EL of the output image corresponding to each output image area.

The pixel calculation circuit K14 calculates the required number of pixels in the sub-scanning direction RL as follows:

$$RL = EA/HS + EL \quad (1)$$

wherein EA is the head DDR address EA of the reference image data item corresponding to each output image area, HS is the number of pixels in the main scanning direction of the original image being input, EL is the number of pixels in the sub-scanning direction of the reference image data item corresponding to each output image area.

The number of pixels in the main scanning direction of the original image HS is unequivocally determined, so that the description thereof is omitted here.

The pixel calculation circuit K14 stores (writes back) the required number of pixels in the sub-scanning direction RL to the parameter storage unit 40c.

According to the first embodiment, the pixel calculation circuit K14 calculates the required number of pixels in the sub-scanning direction RL based on the head DDR address EA of the reference image data item corresponding to each output image area, the number of pixels in the main scanning direction of the input image data HS, and the number of pixels in the sub-scanning direction EL of the reference image data item corresponding to each output image area.

Accordingly, the pixel calculation circuit K14 can calculate the required number of pixels in the sub-scanning direction RL using the parameters rearranged in order of the reference image data items written to the external memory 40. This can reduce the frame delay caused by the image correction.

The sequencer circuit 22s can obtain the number of written pixels in the sub-scanning direction WL that is the number of pixels (lines) in the sub-scanning direction already written to the external memory 40 of the reference image, which is the original image being input, from the write DMAC 16 via the interconnect circuit 18.

The information acquisition circuit K18 acquires information on the number of written lines WL from the write DMAC 16 via the interconnect circuit 18.

The comparison circuit K20 compares the required number of pixels in the sub-scanning direction RL (corresponding to a sub-scanning direction address) calculated with the pixel calculation circuit K14 and the number of written pixels in the sub-scanning direction WL acquired by the information acquisition circuit K18. As a result of the comparison, when a stat is as follows:

$$RL < WL \quad (2)$$

the comparison circuit K20 activates a pending signal Spen (low state). The pending signal Spen is a signal that negates a reference image read request signal to the external memory 40. The reference image read request signal is a request signal to read the reference image (the reference image data items) from the external memory 40. The pending signal Spen is input to an inverting input terminal of the AND circuit K22.

To the other input terminal of the AND circuit K22, a reference image read request signal Srrm output from the CPU 24 is input, and a reference image read request signal Srr is not output from an output terminal of the AND circuit K22 to the external memory 40.

Reading of the reference image from the external memory 40 is temporarily stopped until the above mentioned state (2) is cancelled.

According to the first embodiment, the AND circuit K22 activates the pending signal Spen to disable the reference image read request signal Srr to the external memory 40, when the number of written pixels in the main scanning direction WL is smaller than the required number of pixels in the sub-scanning direction RL as a result of the comparison performed by the comparison circuit K20.

Accordingly, the image correction is not performed until the reference image data item is written to the external memory 40.

On the other hand, the comparison circuit K20 inactivates the pending signal Spen (high state) to assert the reference image read request signal to the external memory 40 when the state is not (2). The AND circuit K22, accordingly, outputs the reference image read request signal Srr, from the output terminal to the reference image storage unit 40a of the external memory 40.

According to the first embodiment, the AND circuit K22 inactivates the pending signal Spen when the number of written pixels in the main scanning direction WL is equal to or larger than the required number of pixels in the sub-scanning direction RL as a result of the comparison performed by the comparison circuit K20.

Accordingly, the image correction can be performed on the reference image data item that is already written to the reference image storage unit 40a of the external memory 40, resulting in reduction of the frame delay caused by the image correction.

Preparation Data for Image Correction

Preparation for data before performing the image correction is described below.

The parameter storage unit 40b that receives the reference image read request signal Srr from the AND circuit K22 of the sequencer circuit 22s outputs the parameter corresponding to the address (address indicating a position where the parameter is stored) output from the parameter processing circuit 30 to the image correction circuit 22 via the interconnect circuit 18.

The image correction circuit 22 that receives the parameter from the parameter storage unit 40b writes the parameter to, for example, the P_SRAM [1] 22c. As a result, the reference image cut-out data and the reference pixel specifying data are stored in the P_SRAM [1] 22c, as illustrated in FIG. 5.

Subsequently, the parameter processing circuit 30 reads the reference image head DDR address, the number of pixels in the main scanning direction and the number of lines in the sub-scanning direction from the P_SRAM [1] 22c as reference image cut-out data to be temporarily stored in the register 22e.

The parameter processing circuit 30 refers the data stored in the register 22e, sets the head DDR address of the reference image as a start address of the read DMAC 26, and adds the number of data blocks indicating the number of pixels in the main scanning direction and the number of lines in the sub-scanning direction to the start address to set an end address.

Subsequently, the image correction control unit 22g outputs the set start address and a read signal to the reference image storage unit 40a via the interconnect circuit 18.

The reference image storage unit 40a outputs the image data corresponding to the start address output from the image correction control unit 22g to the image correction circuit 22 via the interconnect circuit 18.

The addresses from the start address to the end address are set by the image correction control unit 22g, so that pieces of data corresponding to the addresses are sequentially output from the reference image storage unit 40a to the image correction circuit 22 via the interconnect circuit 18. The image correction circuit 22 that receives the reference data from the reference image storage unit 40a writes the reference data to, for example, the P_SRAM [1] 22a. As a result, the R_SRAM [1] 22a stores the reference image data as illustrated in FIG. 5.

Processing of Image Correction

Correction performed by the image correction circuit 22 is described with reference to FIG. 2. The image correction control unit 22g controls the image correction circuit 22 for the correction. Regarding the reference image data item to be stored in the R_SRAM [2] 22b for a B side, a case where the image correction circuit 22 is accessing the external memory 40 to read and acquire the parameter and the reference image data item corresponding to the output image area of (P−1)th area is assumed. In such a case, the correction circuit 22h performs the correction based on the image data item and the parameter previously stored in the R_SRAM [1] 22a and P_SRAM [1] 22c for an A side.

The correction circuit 22h performs the correction on the output image area of (P)th area where the DDRSD RAM read access to the external memory 40 is previously performed.

More specifically, the correction circuit 22h performs the correction on the A side while writing the corrected image data of the B side and reading a correction parameter for the B side and reading the reference image data item for the B side. Additionally, the correction circuit 22h performs the correction on the B side while writing the corrected image data for the A side and reading the correction parameter for the A side and the reference image data item for the A side. The operation described above improves the processing performance by continuously accessing the external memory 40.

The image correction circuit 22 generates the output image data corresponding to the (P) area and outputs the output image data of (P) area in the output image storage unit 40d via the interconnect circuit 18.

As a result, in the (P) area of the output image storage unit 40d, the output image data after the image correction, which is corresponding to the area (P), is stored, and the output image data items after the image correction corresponding to areas (1) to (MN) are sequentially stored in areas from (1) to (MN) of the output image storage unit 40d.

The read DMAC 26 reads the corrected image data stored in the output image storage unit 40d of the external memory 40 via the interconnect circuit 18 and outputs the read image data to the output I/F circuit 28.

With the above-mentioned configuration, the processing of the external memory 40, which is at a former stage of the image correction circuit 22, can be started at the same time as the processing of the image correction circuit 22. The image correction circuit 22 temporarily stops the processing when the transfer (writing) of the reference image data item required for one of the output image areas in the middle is not completed, resulting in reduction of the flame delay as much as possible without disturbing the processing.

Correlation Between Input Image and Output Image

Figure 9:
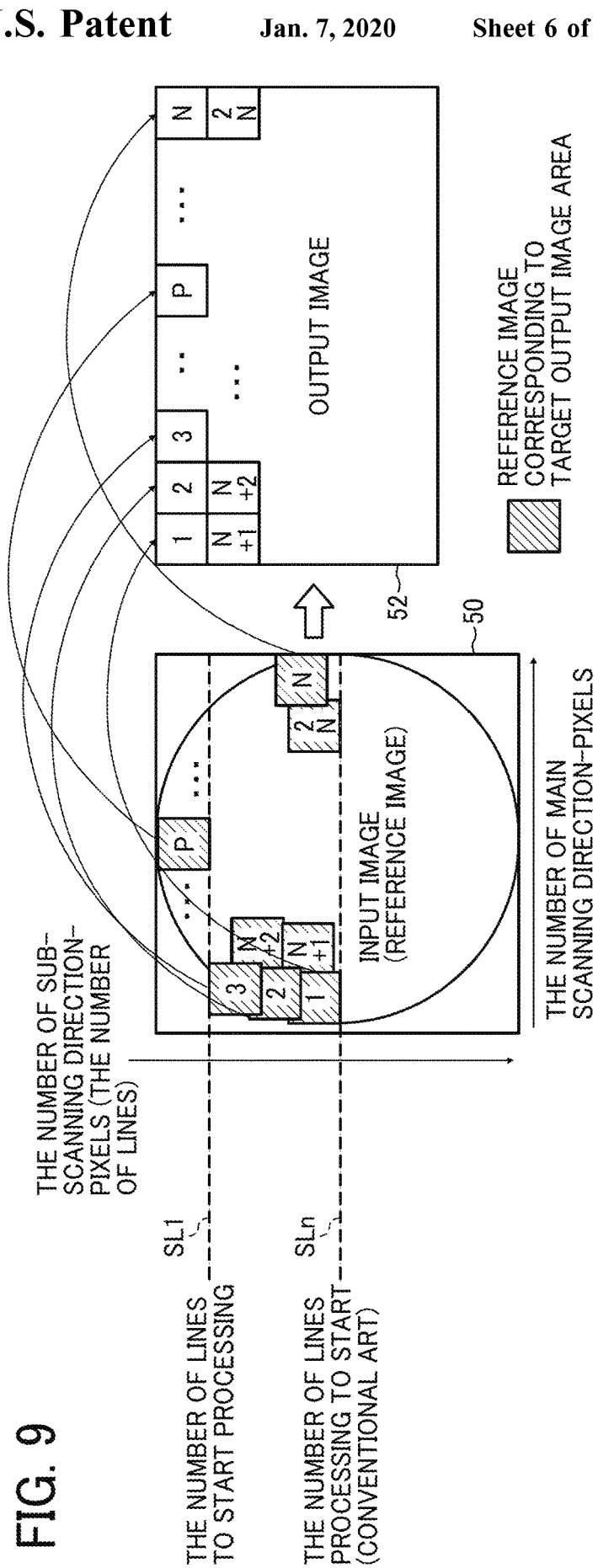
FIG. 9 is an illustration of a correlation between an input image and the output image of FIG. 6.

FIG. 9 is an illustration of a correlation between an input image 50 and an output image 52 when the image output area described in FIG. 6 is an output object. The input image 50 is stored in the external memory 40. In FIG. 9, squares 1, 2, 3 ... P ... N illustrated with oblique lines in the input image 50 are the reference image areas required for outputting respective output image areas indicated by squares 1, 2, 3 ... P ... N in the output image.

The write DMAC 16 inputs the input image 50 that is output from, for example, a camera, and transfers (writes) the data (data items) sequentially to the external memory 40 in a downward direction on a sheet illustrated in FIG. 9.

Conventionally, the required number of pixels in the sub-scanning direction (the number of lines) to generate the output image of the area 1 is the number of lines SLn with which the processing can be started as illustrated in FIG. 9. This is because the image correction circuit according to the conventional art acquires parameters (reference image cut-out data and the reference pixel specifying data) sequentially from the area 1 from a parameter storage unit of an external memory.

By contrast, in one of the embodiments of the present disclosure, generating the output image is started from the area P, so that generating the output image can be started from the number of lines SL1 as illustrated in FIG. 9.

According to the first embodiment, the parameter storage circuit K16 stores the parameter to read reference image data item from the external memory 40. The parameter processing circuit 30 rearranges the parameters in the order of the reference image data items written to the external memory 40. The pixel calculation circuit K14 calculates the required number of pixels in the sub-scanning direction RL required for performing a predetermined image correction based on the parameter acquired from the parameter processing circuit 30. The information acquisition circuit K18 acquires the number of written pixels in the sub-scanning direction WL in association with the input image data in the middle of being written to the external memory 40. The comparison circuit K20 compares the required number of pixels in the sub-scanning direction RL and the number of written pixels in the sub-scanning direction WL. The AND circuit K22 determines whether the reference image data item corresponding to the parameter can be acquired from the external memory 40 based on a result of the comparison performed with the comparison circuit K20.

Through this, the image correction can be performed on the reference image data item written first to the external memory 40, resulting in reduction of the frame delay caused by the image correction.

Second Embodiment

An image processing device according to a second embodiment is described below.

The image processing device according to the second embodiment is configured the same way as the image processing device 1 illustrated in FIG. 1 and includes the image correction circuit 22 illustrated in FIG. 2.

However, in the first embodiment, the rearrangement of the parameters are performed within the line having the first area corresponding to the first output image in the processing of the image correction circuit 22 illustrated in FIG. 8.

Figure 10:
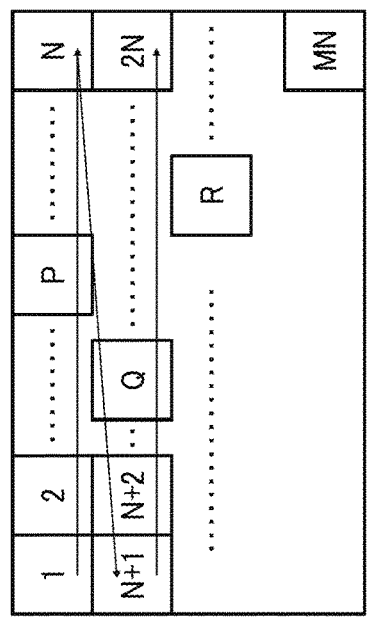
FIG. 10 is an illustration of an output image for describing rearrangement of the number of pixels in a sub-scanning direction for each line including areas.

By contrast, in the second embodiment, the parameter processing circuit 30 rearranges the parameters using the minimum number of pixels (lines) in the sub-scanning direction for each line, which the input image is obtained the earliest among the corresponding areas, as illustrated in FIG. 10.

Example of Rearrangement in Each Line Including Areas

FIG. 10 is an illustration of an output image for describing rearrangement of the number of pixels in a sub-scanning direction for each line including the areas. According to the second embodiment, the parameter processing circuit 30 rearranges the parameters so that a parameter corresponding to the output image area in which the required number of pixels in the sub-scanning direction is the minimum has a priority in each line.

Through this, the required number of pixels in the sub-scanning direction RL can be calculated using the parameter in which the required number of pixels in the sub-scanning direction is the minimum among the output image areas, resulting in reduction of the frame delay caused by the image correction.

Correlation Between Input Image and Output Image

Figure 11:
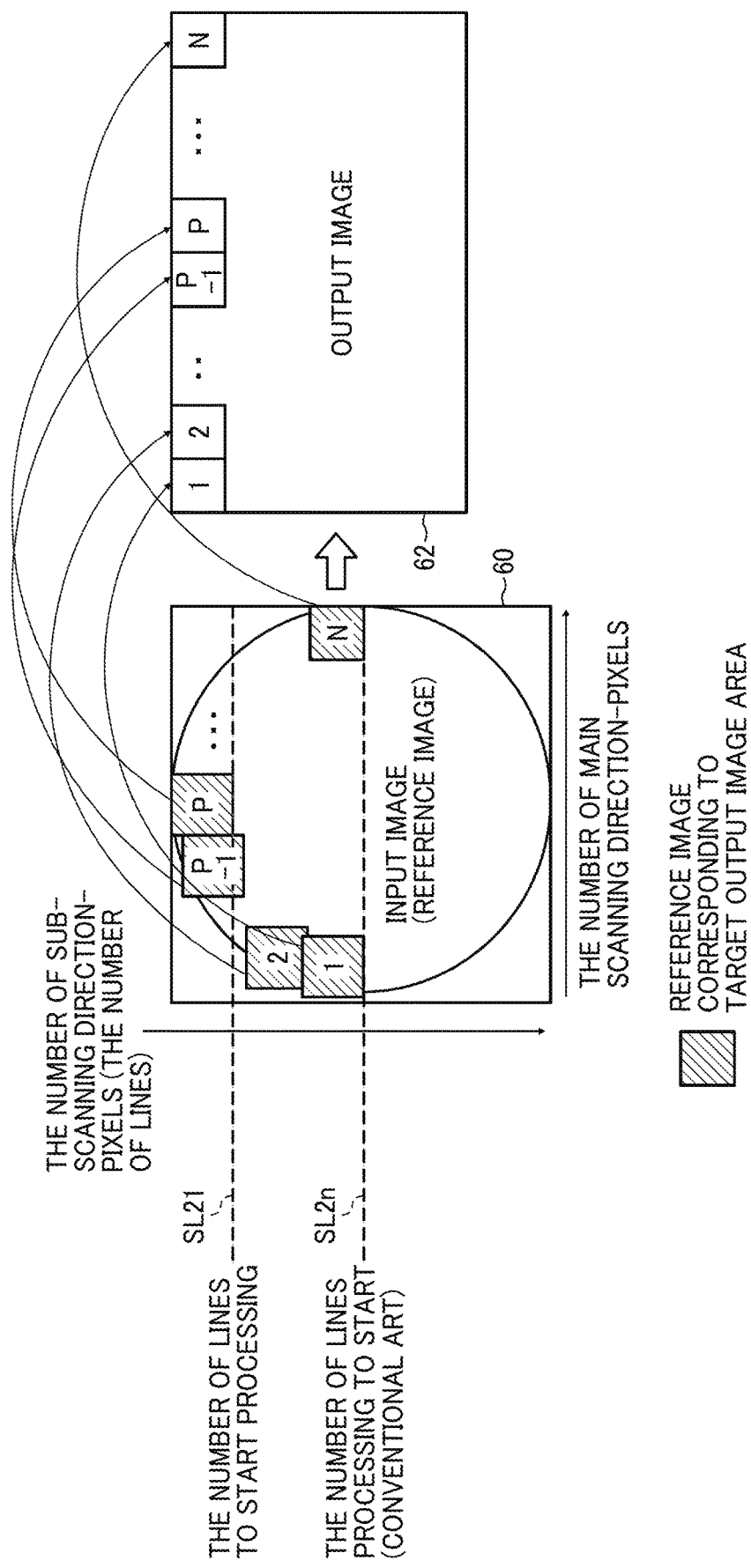
FIG. 11 is an illustration of a correlation between an input image and an output image which are used by an image processing device according to a second embodiment of the present disclosure.

FIG. 11 is an illustration of a correlation between an input image and an output image, which are used by an image processing device according to the second embodiment of the present disclosure.

Example of Rearrangement

FIG. 11 is an illustration of the output image in which parameters are rearranged from an arbitrary start position. In FIG. 11, a position to start the processing performed by the image correction circuit 22 is arbitrarily set when there is not so much difference between the number of lines in the sub-scanning direction of area P, which has the minimum number of lines in the sub-scanning direction, and the number of lines in the sub-scanning direction of area P−1, which is located immediately proceeding the area P.

The write DMAC 16 inputs an input image 60 output from, for example, a camera, and transfers (writes) sequentially to downward direction on a sheet of FIG. 11.

Conventionally, the required number of pixels (lines) in the sub-scanning direction to generate an output image corresponding to the area 1 is the number of lines SL2n, as illustrated in FIG. 11, from which the processing can start.

In the present embodiment, generating the output image is started from the area P, so that generating the output image can be started from the number of lines SL21, which is the minimum number of lines that can start the processing, as illustrated in FIG. 11.

According to the second embodiment, the parameter processing circuit 30 rearranges the parameters in a manner that an arbitrary output image area is to be a position to start.

Through this, the required number of pixels in the sub-scanning direction RL can be calculated using a parameter corresponding to the arbitrary output image area that is to be a position to start the processing, resulting in reduction of the frame delay caused by the image correction.

Third Embodiment

An image processing device 100 according to a third embodiment is described below.

Figure 12:
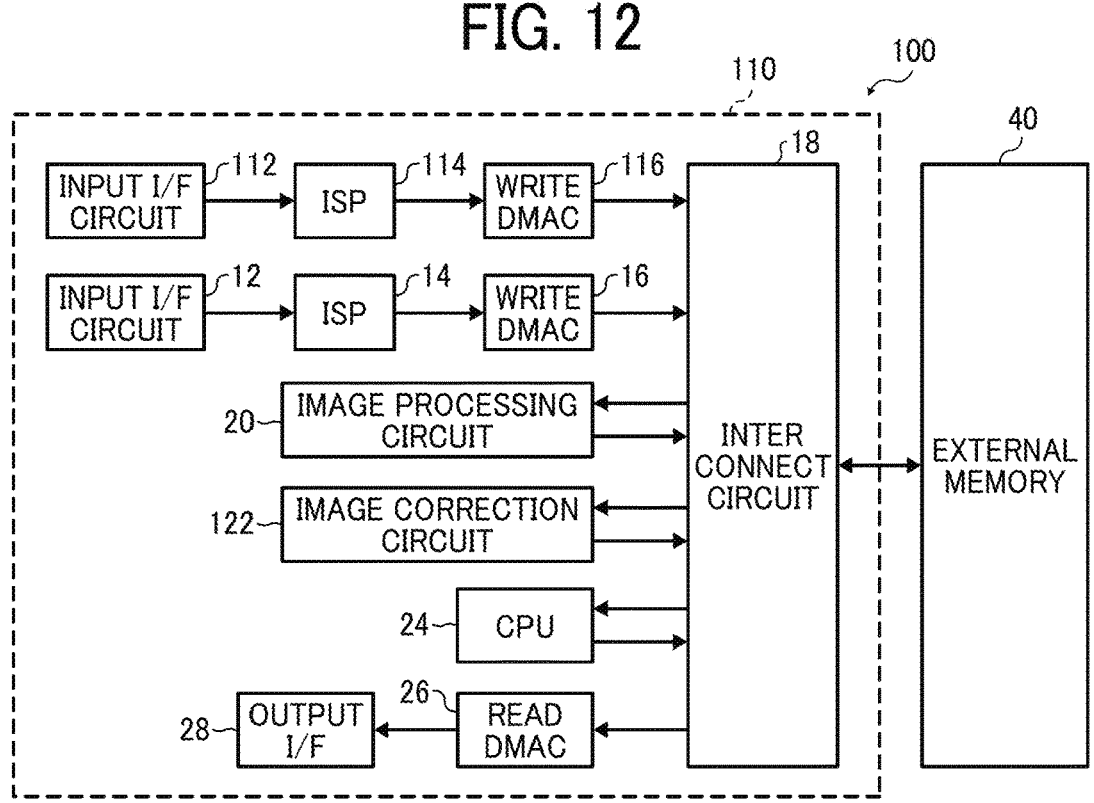
FIG. 12 is a block diagram illustrating an image processing device according to a third embodiment of the present disclosure.

FIG. 12 is a block diagram illustrating a configuration of the image processing device 100 according to the third embodiment of the disclosure. The image processing device 100 according to the third embodiment includes a semiconductor device 110.

In FIG. 12, the semiconductor device 110 includes an input interface (I/F) circuit 112 to connect a second camera, an IPS 114, and a write DMAC 116, in addition to the components included in the semiconductor device 10 of the image processing device 1 according to the first embodiment. An image correction circuit 122 in the semiconductor device 110 is assigned a reference numeral that is different from the image correction circuit 22 in the semiconductor device 10.

Image Correction Circuit and Related Blocks

Figure 13:
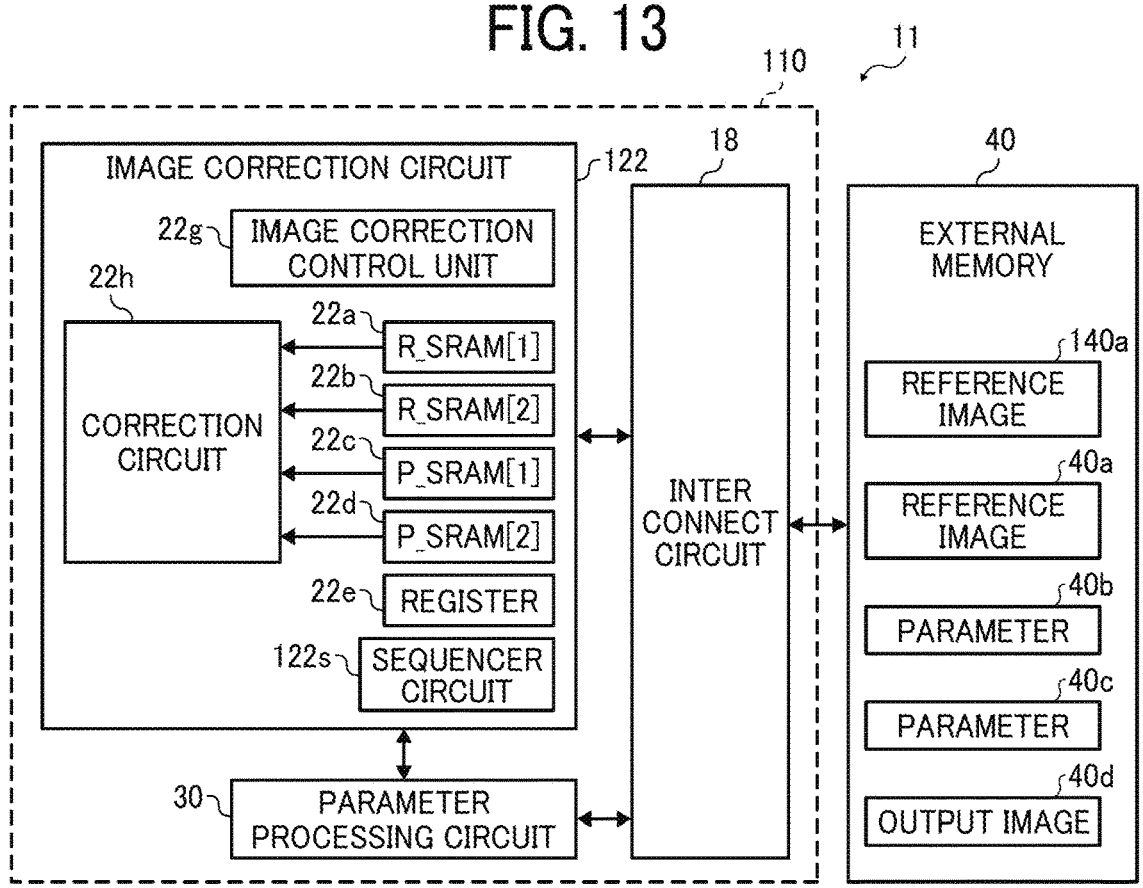
FIG. 13 is a block diagram illustrating the image processing device according to the third embodiment including an image correction circuit illustrated in FIG. 12 and a component related to the image correction circuit illustrated in FIG. 12.

FIG. 13 is a block diagram illustrating an image processing device 11 including the image correction circuit 122 of FIG. 12 for explaining the image correction circuit 122 of FIG. 12 and related blocks thereof. The external memory 40 illustrated in FIG. 13 stores a reference image input from the second camera in a reference image storage unit 140*a*. The image correction circuit 122 includes a sequencer circuit 122*s* to perform sequential operation in reading the reference image.

Order of Steps in Processing of Sequencer Circuit

FIG. 14 is an illustration of the sequencer circuit 122*s* that processes a plurality of input images, and order of steps of processing thereof.

The sequencer circuit 122*s* of FIG. 14 is assumed to be used for the plurality of input images when images are input from a plurality of cameras (for example the first camera and the second camera).

In the third embodiment, the sequencer circuit 122*s* that processes two or more reference images being input is used, which is different from the description of the sequencer circuit 22*s* (FIG. 8) according the first embodiment.

The sequencer circuit 122*s* according to the third embodiment includes a first camera information acquisition circuit K50, a second camera information acquisition circuit K52, and a second comparison circuit K54 in addition to the components that are included in the sequencer circuit 22*s* according to the first embodiment.

The second comparison circuit K54 compares between the numbers of written lines WL1 and WL2 for each of the plurality of input images, and the smaller number of the written lines is used. The comparison circuit K20 compares a value of the smaller number of the written lines mentioned above and a value of the minimum sub-scanning address from reference image cut-out data.

More specifically, the first camera information acquisition circuit K50 acquires the information on the number of written lines WL1 in association with the first camera from the write DMAC 16 via the interconnect circuit 18.

The second camera information acquisition circuit K52 acquires the information on the number of written lines WL2 in association with the second camera from the write DMAC 116 via the interconnect circuit 18.

The second comparison circuit K54 compares between the number of written lines in association with the first camera and the number of written lines in association with the second camera and outputs the information of the smaller number of lines to the comparison circuit K20.

According to the third embodiment, the second comparison circuit K54 compares the number of written pixels in the sub-scanning direction WL1 in association with the first camera and the number of written pixels in the sub-scanning direction WL2 in association with the second camera, and then the smaller number of written lines in the sub-scanning direction obtained by the comparison is given to the comparison circuit K20. The comparison circuit K20 compares the required number of written pixels in the sub-scanning direction given from the second comparison circuit K54 to the required number of pixels in the sub-scanning direction RL corresponding to the reference image data.

Through this, the image correction can be performed on the reference image data item that is written first to the external memory 40 in a stereo camera including the first camera and the second camera, resulting in reduction of the frame delay caused by the image correction.

The image processing device 1 according to a first aspect reads a part of reference image data (reference image data item) to be processed from input image data stored in the external memory 40, performs image correction on the reference image data item to generate image data corresponding to an output image area.

The image processing device 1 of the present aspect includes a parameter storage circuit K16 to store each parameter used for reading a corresponding one of a plurality of reference image data items, a parameter processing circuit 30 to rearrange the parameters in order of the reference image data items written to the external memory 40, a pixel calculation circuit K14 to calculate the required number of pixels in a sub-scanning direction that is required for performing a predetermined image correction based on the parameters acquired from the parameter processing circuit 30, an information acquisition circuit K18 to acquire the number of written pixels WL in the sub-scanning direction that is already written to the external memory 40 in the middle of writing of the associated input image data to the external memory 40, a comparison circuit K20 to compare the required number of pixels in the sub-scanning direction RL and the number of written pixels in the sub-scanning direction WL, and the AND circuit K22 to determine whether the reference image data item associated with the parameter can be obtained from the external memory 40.

According to the first aspect, the parameter storage circuit K16 stores each parameter used to read the corresponding one of a plurality of reference image data items from the external memory 40. The parameter processing circuit 30 rearranges the parameters in order of the reference image data items written to the external memory 40. The pixel calculation circuit K14 calculates the required number of pixels in the sub-scanning direction RL that is required for performing the predetermined image correction based on the parameter acquired from the parameter processing circuit 30. The information acquisition circuit K18 acquires the number of written pixels in the sub-scanning direction WL in association with the input image data in the middle of writing the input image data to the external memory 40. The comparison circuit K20 compares the required number of pixels in the sub-scanning direction RL and the number of written pixels in the sub-scanning direction WL. The AND circuit K22 determines whether the reference image data item corresponding to the parameter can be obtained from the external memory 40 based on a result of the comparison performed with the comparison circuit K20.

Through this, the image correction can be performed on the reference image data item written first to the external memory 40, resulting in reduction of frame delay caused by the image correction.

The image processing device 1 of a second aspect includes the AND circuit K22 that activates a pending signal Spen that disables the read request signal Sr to the external memory 40*r* to read the reference image data, when the number of written pixels in the main scanning direction WL is smaller than the required number of pixels in the sub-scanning direction RL as a result of the comparison performed by the comparison circuit K20.

According to the present aspect, the AND circuit K22 activates the pending signal Spen that disables the read request signal Srr to the external memory 40 to read the reference image data, when the number of written pixels in the main scanning direction WL is smaller than the required number of pixels in the sub-scanning direction RL as a result of the comparison performed by the comparison circuit K20. Accordingly, the image correction processing is not performed until the reference image data item is written to the external memory 40.

The AND circuit K22 of a third aspect inactivates the pending signal Spen when the number of written pixels in the main scanning direction WL is equal to or larger than the required number of pixels in the sub-scanning direction RL as a result of the comparison performed by the comparison circuit K20.

According to the present aspect, the AND circuit K22 inactivates the pending signal Spen when the number of written pixels in the main scanning direction WL is equal to or larger than the required number of pixels in the sub-scanning direction RL as a result of the comparison performed by the comparison circuit K20.

Through this, the image correction can be performed on one of the plurality of reference image data items written to the external memory 40 prior to the other ones of the plurality of reference image data items, resulting in reduction of the frame delay caused by the image correction.

The image correction circuit 22 of a forth aspect further includes the second comparison circuit K54 to compare the number of written pixels in the sub-scanning direction WL1 in association with the first camera and the number of written pixels in the sub-scanning direction WL2 in association with the second camera, and then the smaller number of written lines in the sub-scanning direction obtained by the comparison is given to the comparison circuit K20. The comparison circuit K20 compares the required number of written pixels in the sub-scanning direction given from the second comparison circuit K54 and the required number of pixels RL corresponding to the reference image data.

According to the present aspect, the second comparison circuit K54 compares the number of written pixels in the sub-scanning direction WL1 in association with the first camera and the number of written pixels in the sub-scanning direction WL2 in association with the second camera, and then the smaller number of written lines in the sub-scanning direction obtained by the comparison is given to the comparison circuit K20. The comparison circuit K20 compares one of the required numbers of written pixels in the sub-scanning direction that is given from the second comparison circuit K54 and the required number of pixels RL corresponding to one of the plurality of reference image data items.

Through this, the image correction can be performed on the one of the plurality of reference image data items that is written to the external memory 40 prior to the other ones of the plurality of reference image data items in a stereo camera including the first camera and the second camera, resulting in reduction of the frame delay caused by the image correction.

The pixel calculation circuit K14 according to a fifth aspect, calculates the required number of pixels in the sub-scanning direction RL based on the head DDR address EA of the reference image data item corresponding to each output image area, the number of pixels in the main scanning direction of the input image data HS, and the number of pixels in the sub-scanning direction EL of the reference image data item corresponding to each output image area.

According to the present aspect, the pixel calculation circuit K14 calculates the required number of pixels in the sub-scanning direction RL based on the head DDR address EA of the reference image data item corresponding to each output image area, the number of pixels in the main scanning direction of the input image data HS, and the number of pixels in the sub-scanning direction EL of the reference image data corresponding to each output image area.

Accordingly, the pixel calculation circuit K14 can calculate the required number of pixels in the sub-scanning direction RL using the parameters rearranged in order of the reference image data items written to the external memory 40.

The parameter processing circuit 30 according to a sixth aspect rearranges parameters in each area line so that a parameter corresponding to the output image area that has the minimum required number of pixels in the sub-scanning direction has a priority in the order.

According to the present aspect, the parameter processing circuit 30 rearranges the parameters so that the parameter corresponding to the output image area that has the minimum required number of pixels in the sub-scanning direction has a priority in each area line.

Through this, the required number of pixels in the sub-scanning direction RL can be calculated using the parameter having the minimum required number of pixels in the sub-scanning direction in each area line, resulting in reduction of the frame delay caused by the image correction.

The parameter processing circuit 30 of a seventh aspect rearranges parameters so that an arbitrary output image area is to be a position to start the processing.

According to the present aspect, the parameter processing circuit 30 rearranges the parameters so that an arbitrary output image area is to be the position to start the processing.

Through this, the required number of pixels in the sub-scanning direction RL can be calculated using the parameter corresponding to the arbitrary output image area that is the position to start the processing, resulting in reduction of the frame delay caused by the image correction.

The image correction circuit 22 according to the eighth aspect includes a parameter storage circuit K16 to store each parameter used for reading a corresponding one of a plurality of reference image data items, a parameter processing circuit 30 to rearrange the parameters in order of the reference image data items written to the external memory 40, a pixel calculation circuit K14 to calculate the required number of pixels in a sub-scanning direction that is required for performing a predetermined image correction based on the parameters acquired from the parameter processing circuit 30, an information acquisition circuit K18 to acquire the number of written pixels WL in the sub-scanning direction that is already written to the external memory 40 in the middle of writing of the associated input image data to the external memory 40, a comparison circuit K20 to compare the required number of pixels in the sub-scanning direction RL and the number of written pixels in the sub-scanning direction WL, and the AND circuit K22 to determine whether the reference image data item associated with the parameter can be obtained from the external memory 40.

Although the embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image processing device, comprising:
   an image memory configured to store a plurality of parameters in a first order corresponding to a plurality of reference image data items, each of the plurality of parameters having a corresponding one of the plurality of reference image data items and the plurality of reference image data items corresponding to input image data which is to be reference data;
   a parameter processing circuit configured to rearrange the plurality of parameters into a second order different from the first order; and
   an image correction circuit configured to read one of the plurality of reference image data items from the image memory and perform image correction on the one of the plurality of reference image data items to generate an output image corresponding to one of a plurality of output image areas, wherein
   the image correction circuit comprises:
      a pixel calculation circuit configured to calculate a required number of pixels in a sub-scanning direction required to perform the image correction on the one of the plurality of reference image data items to generate the output image corresponding to the one of the plurality of output image areas based on the corresponding one of the plurality parameters from the second order;
      an acquisition circuit configured to acquire a number of written pixels in the sub-scanning direction already written to the image memory in a middle of writing the input image data;
      a first comparison circuit configured to compare the required number of pixels in the sub-scanning direction and the number of written pixels in the sub-scanning direction; and
      a logic circuit configured to determine whether the one of the plurality reference image data items corresponding to the one of the plurality of parameters is to be acquired from the image memory based on a result of the comparison performed by the first comparison circuit.

2. The image processing device of claim 1, wherein
   the logic circuit activates a pending signal when the result of the comparison indicates that the number of written pixels in the sub-scanning direction already written to the image memory is smaller than the required number of pixels in the sub-scanning direction required to perform the image correction, and
   the pending signal disables a read request signal to the image memory to read the reference image data items.

3. The image processing device of claim 2, wherein the logic circuit deactivates the pending signal when the result of the comparison indicates that the number of written pixels in the sub-scanning direction already written to the image memory is equal to or larger than the required number of pixels in the sub-scanning direction required to perform the image correction.

4. The image processing device of claim 1, further comprising a second comparison circuit configured to compare a first number of written pixels in the sub-scanning direction in association with a first camera and a second number of written pixels in the sub-scanning direction in association with a second camera and provide a smaller of the first number of written pixels and the second number of written pixels to the first comparison circuit,
   wherein the first comparison circuit compares the smaller of the first number of written pixels in the sub-scanning direction and the second number of written pixels in the sub-scanning direction that is provided from the second comparison circuit and the required number of pixels in the sub-scanning direction.

5. The image processing device of claim 1, wherein the pixel calculation circuit calculates the required number of pixels in the sub-scanning direction required to perform the image correction based on:
   a head address of the one of the plurality of reference image data items corresponding to the one of the plurality of output image areas;
   a number of pixels in a main scanning direction of the input image data; and
   a number of pixels in the sub-scanning direction of the one of the reference image data items corresponding to the one of the plurality of output image areas.

6. The image processing device of claim 1, wherein the parameter processing circuit rearranges the plurality of parameters into the second order by at least assigning priority to the one of the plurality of parameters corresponding to one of the plurality of output image areas having a minimum required number of pixels in the sub-scanning direction for the image correction in an area line.

7. The image processing device of claim 1, wherein the parameter processing circuit rearranges the plurality of parameters into the second order by at least assigning priority to one of the plurality of parameters having a start position corresponding to an arbitrary one of the plurality of output image areas.

8. The image processing device of claim 1, wherein the parameter processing circuit stores the plurality of parameters in the image memory in the second order.

9. The image processing device of claim 1, wherein the parameter processing circuit rearranges the plurality of parameters into the second order which is an order in which the plurality of output image areas are generated.

10. The image processing device of claim 7, wherein
    output image data is divided into N of the plurality of output image areas in a main scanning direction and divided into M of the plurality of output image areas in the sub-scanning direction, resulting in MN of the plurality of output image areas as a total in the output image data,
    the plurality of output image areas from 1 to N are defined as a first area line, and
    the start position is one other than a position of the output image areas at 1.

11. The image processing device of claim 1, wherein the image correction circuit comprises a parameter memory configured to store each of the plurality of parameters used to read the corresponding one of the plurality of reference image data items from the image memory.

* * * * *